Nov. 2, 1954 R. A. WALLACE 2,692,996
LUBRICATION MEANS FOR PIPE-CUTTING AND THREADING MACHINES
Filed Feb. 24, 1950 9 Sheets-Sheet 1

INVENTOR.
Richard A. Wallace
BY
ATTORNEY

Nov. 2, 1954 R. A. WALLACE 2,692,996
LUBRICATION MEANS FOR PIPE-CUTTING AND THREADING MACHINES
Filed Feb. 24, 1950 9 Sheets-Sheet 2
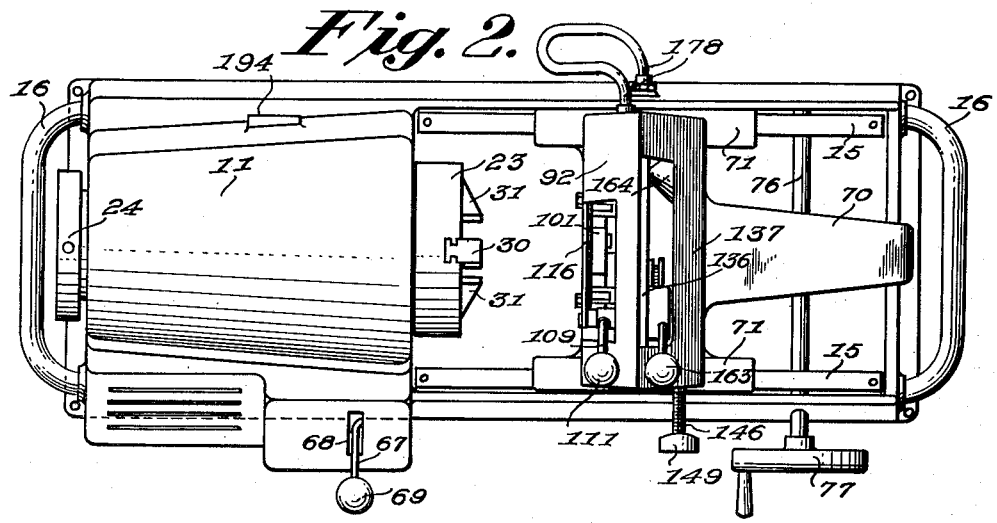
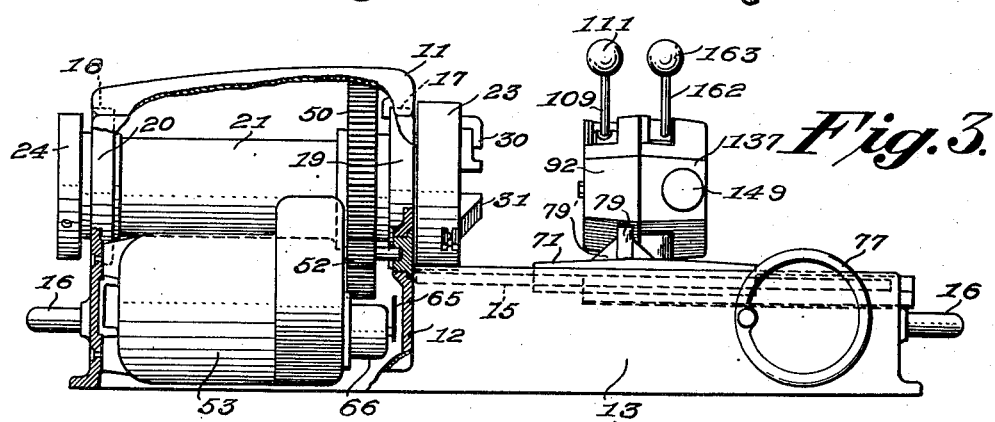
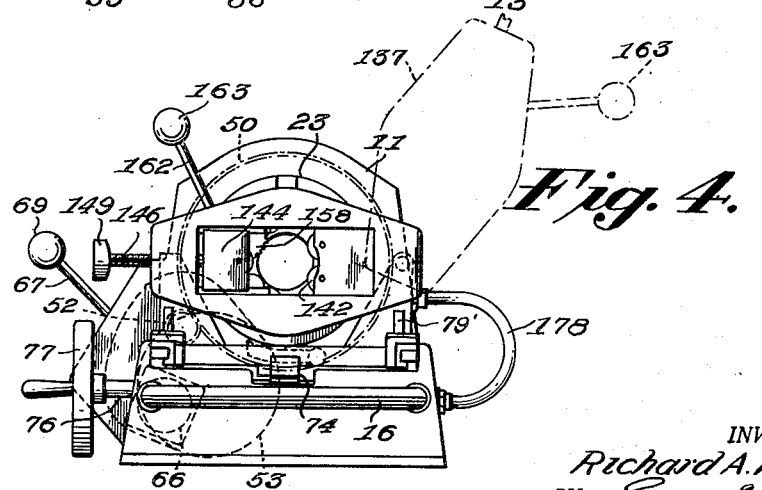
INVENTOR.
Richard A. Wallace
BY
ATTORNEY.

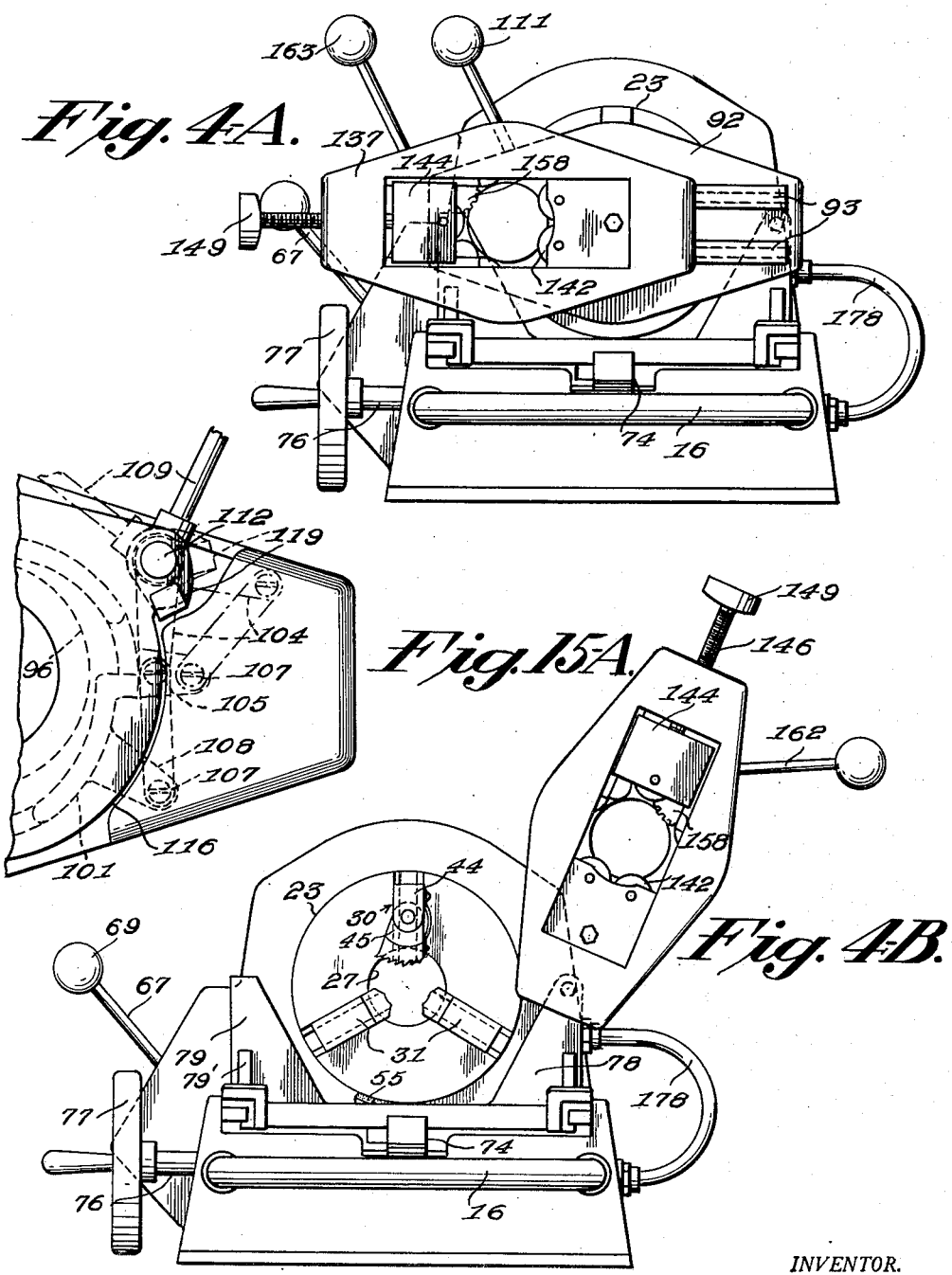

Nov. 2, 1954  R. A. WALLACE  2,692,996
LUBRICATION MEANS FOR PIPE-CUTTING AND THREADING MACHINES
Filed Feb. 24, 1950  9 Sheets-Sheet 4

INVENTOR.
Richard A. Wallace
BY
ATTORNEY.

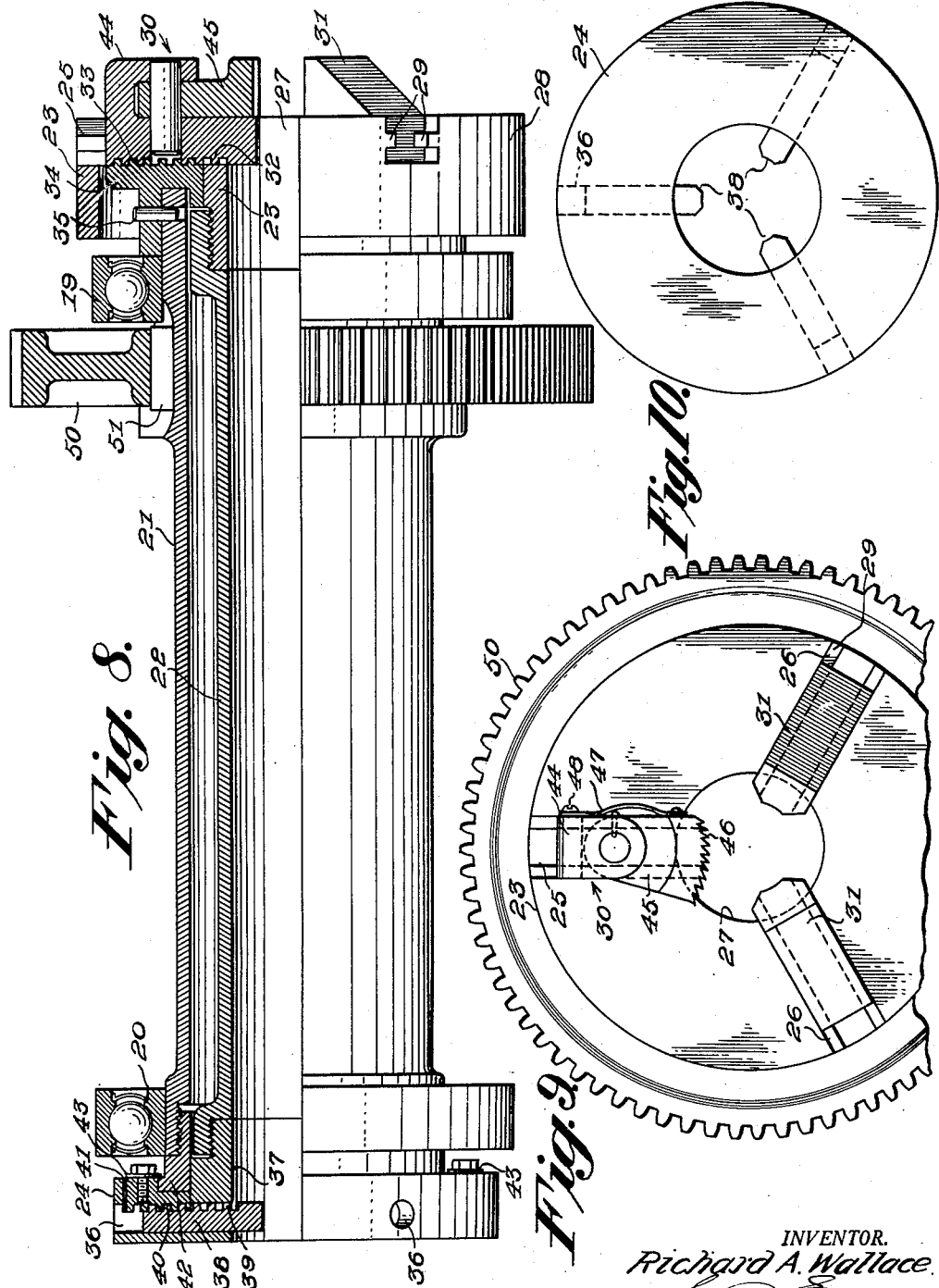

Nov. 2, 1954    R. A. WALLACE    2,692,996
LUBRICATION MEANS FOR PIPE-CUTTING AND THREADING MACHINES
Filed Feb. 24, 1950    9 Sheets-Sheet 6

INVENTOR.
Richard A. Wallace
BY
ATTORNEY.

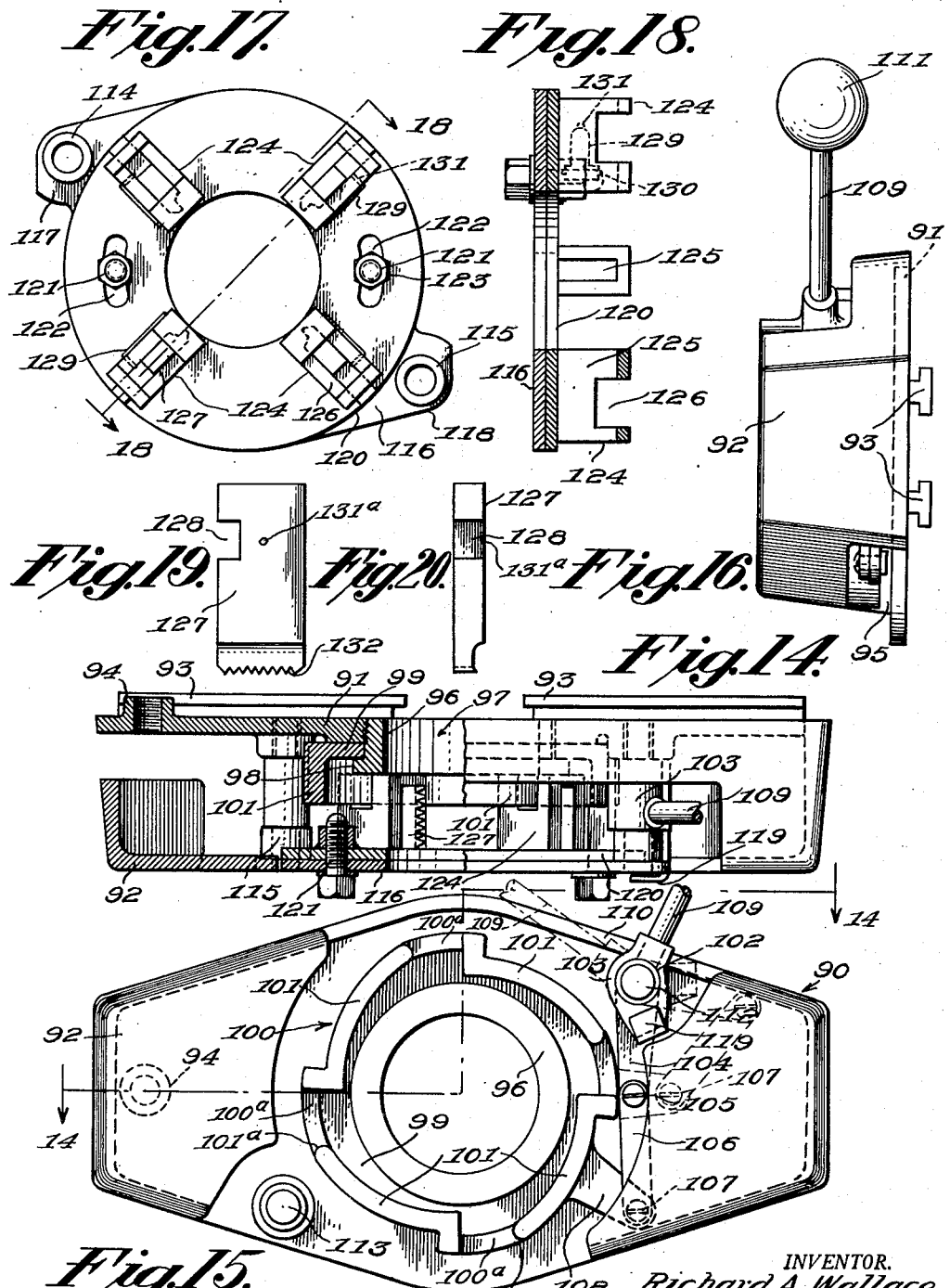

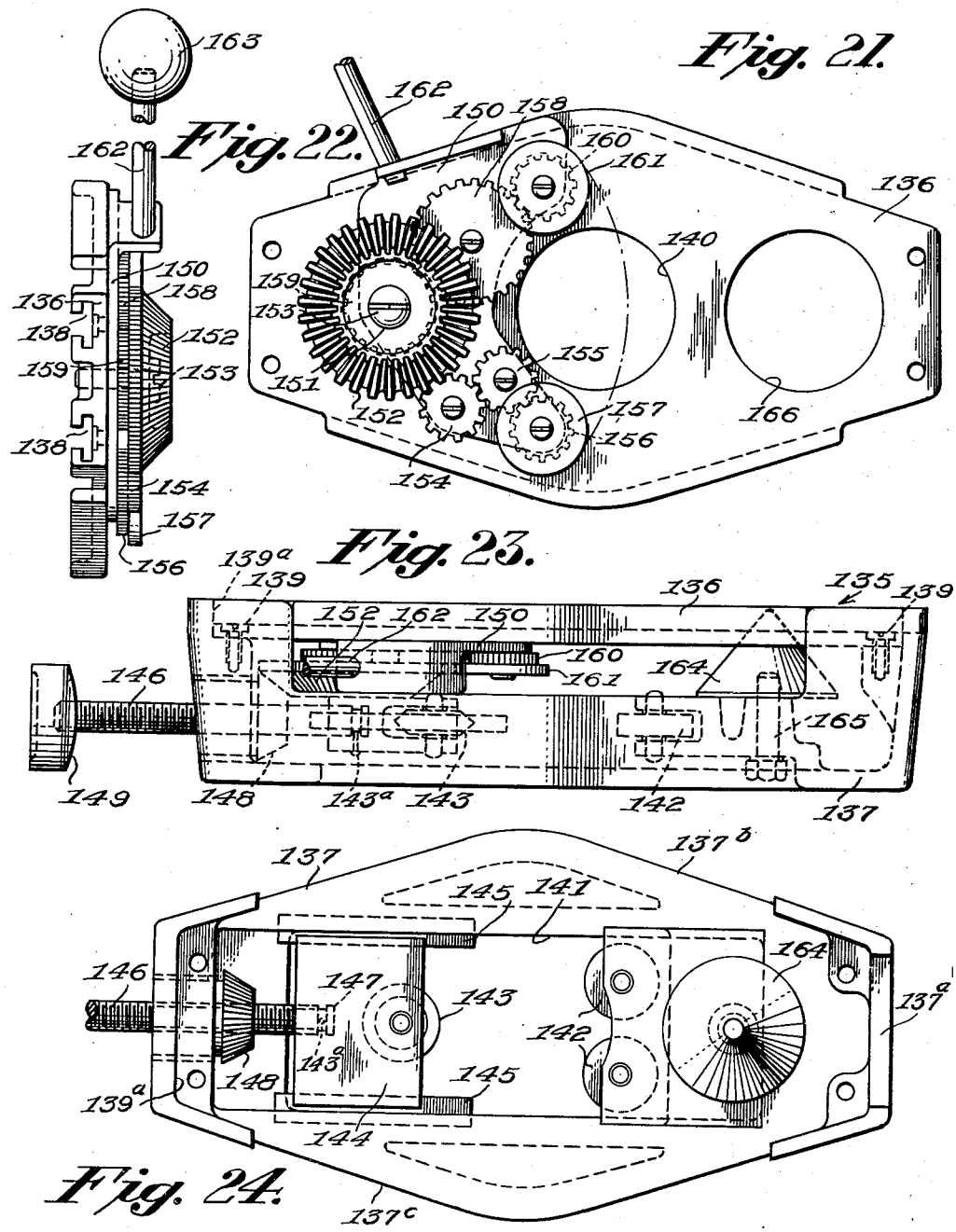

Nov. 2, 1954            R. A. WALLACE            2,692,996
LUBRICATION MEANS FOR PIPE-CUTTING AND THREADING MACHINES
Filed Feb. 24, 1950            9 Sheets-Sheet 9
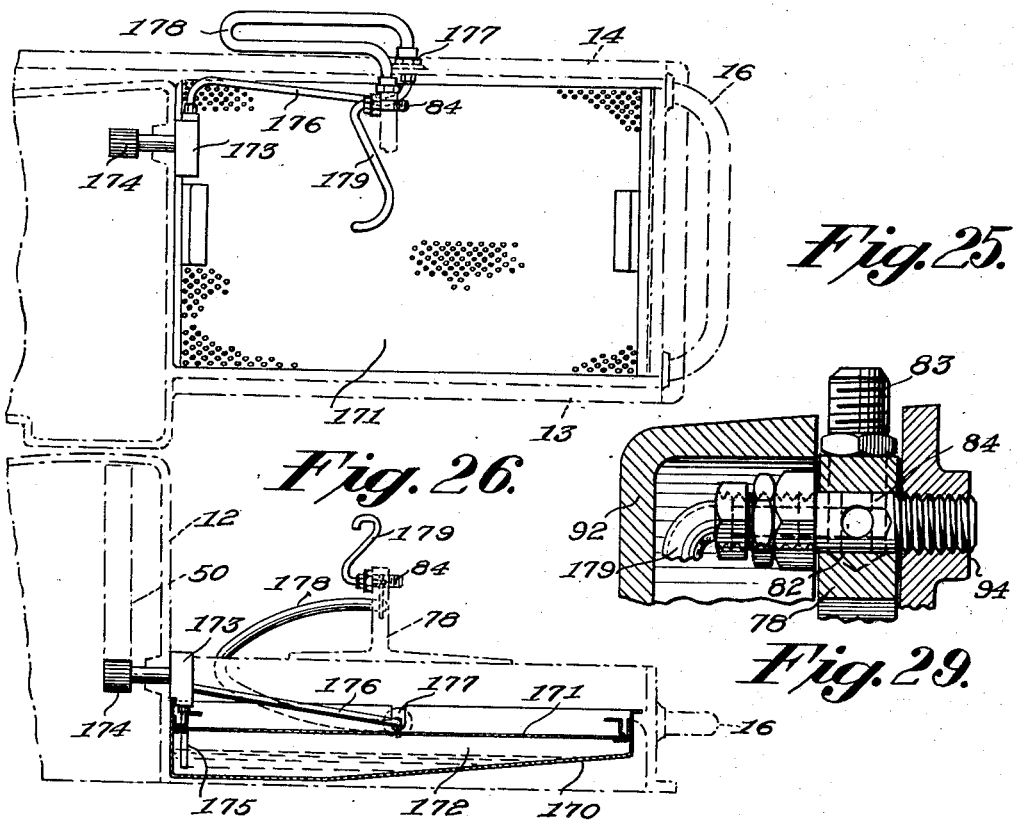
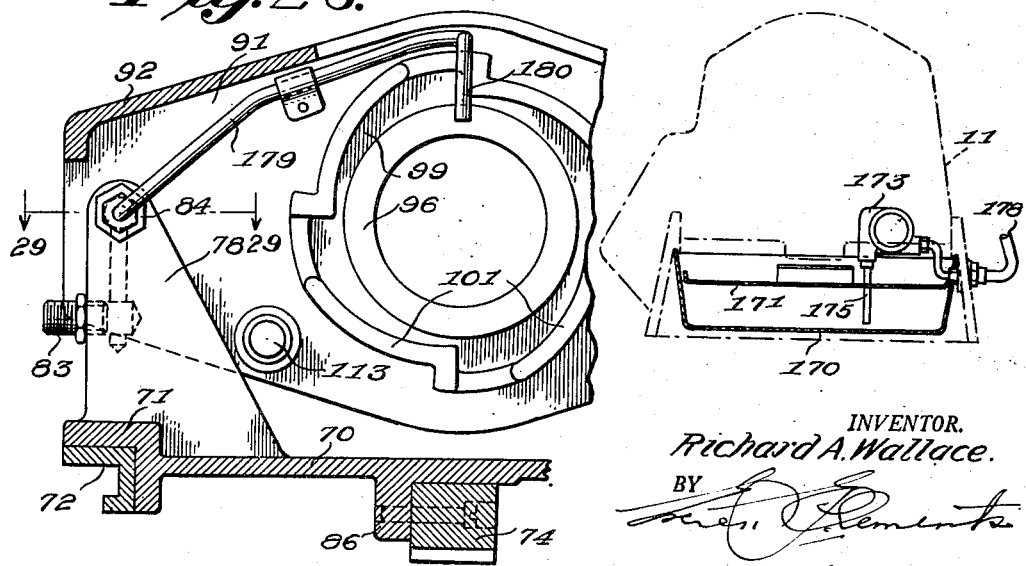
INVENTOR.
Richard A. Wallace.
BY
ATTORNEY.

United States Patent Office 2,692,996
Patented Nov. 2, 1954

2,692,996

LUBRICATION MEANS FOR PIPE-CUTTING AND THREADING MACHINES

Richard A. Wallace, Merion, Pa.

Application February 24, 1950, Serial No. 145,974

4 Claims. (Cl. 10—106)

This invention relates to lubricating means for a portable pipe threading, cutting, and reaming machine.

The machine in accordance with the present invention is a portable field machine of the general type which is capable of threading, cutting-off, and reaming pipe under 2" in diameter by mechanisms attached to a carriage sliding on ways, having said pipe gripped by a chuck and rotated by an electric motor included in the machine.

More particularly, the invention is concerned with a machine embodying novel mechanisms for aligning and gripping the pipe and for successively cutting-off, threading, reaming, and screwing a fitting onto a pipe while same is constantly rotated.

One of the objects of the invention is to provide a portable field machine having a power operated automatic chuck which will handle pipe sizes varying from ½" to 2" in diameter, wherein the chuck is operative to align, grip, and release the work through control means operated by a single controlling handle, relieving the operator of the time and effort for tightening and opening the chuck by hand.

A further object of the invention is to provide a portable machine with a carriage adapted for manually controlled sliding movement axially to the work and carrying threading, cutting-off, and reaming mechanisms rotatably attached to the carriage, which are capable of being rotated out of the way of the pipe to allow a pipe fitting to be screwed onto the threaded pipe, using the machine motor to rotate the pipe, thus speeding up and saving effort for the assembling of the pipe and fittings.

A further object of the invention is to provide a portable machine having simplified interchangeable threading assemblies to thread the various pipe and bolt sizes within the capacity of the machine, these threading assemblies being of the radial opening type, simple and easy to install and remove from the machine, having a common opening mechanism rotatably attached to the carriage, and being opened and closed by a single operating handle.

A further object of the invention is to provide a portable machine having a cutting-off mechanism which is power driven through friction means from the rotating pipe, being slidably attached to the threading mechanism mounted on the carriage for instant alignment with different size pipe, and having the cut-off tool driven into and away from the pipe by a single operating handle thus relieving the operator of muscular effort to move the cut-off tool into and away from the pipe.

A further object of the invention is to provide a portable machine with a reamer mounted at the rear of the cutting-off mechanism in an enclosed position for safety and compactness, which reamer is capable of sliding into operating position directly behind the threading chasers, saving the operator time and effort for extensive repositioning of the carriage for reaming.

A further object of the invention is the provision of a novel cutting oil system which assures the delivery of clean cutting oil to the work adjacent the point of threading operation thereon, having an automatic shut-off valve operable to stop the supply of cutting oil when the carriage mechanisms are in position to allow the screwing of a fitting onto a pipe rotating in the machine.

A still further object of the invention is to provide a portable field machine having a pleasing appearance, having a special space provided on the frame for the trade name of the machine, and employing a minimum of operating controls organized for convenient and ready use by semi-skilled labor.

A still further object of the invention is the provision of a portable field machine of the type described which is safe and compact, durably constructed of light weight materials, and providing fast and dependable performance, flexible use, and easy maintenance.

Other objects and advantages of the invention will become apparent in the course of the following detailed description, taken in connection with the accompanying drawings, wherein:

Fig. 2 is a top plan view of the machine;

Fig. 3 is a side elevational view of the machine, partially broken away and in vertical section for disclosing certain internal structure;

Fig. 4 is an end elevation as observed from the right hand end of Figs. 2 and 3 and wherein the work operating assemblies are shown in dotted lines;

Fig. 4A is a view similar to Fig. 4 but wherein the reaming assembly has been moved to operative position;

Fig. 4B is also a view similar to Fig. 4 but wherein the die assembly together with the cut-off and reaming assemblies have been jointly moved to inoperative or make-up position;

Fig. 8 is a vertical axial section of a work gripping chuck assembly embodied in the machine.

Fig. 9 is a broken elevational view as observed from the right hand end of Fig. 8;

Fig. 10 is an elevational view as observed from the left hand end of Fig. 8;

Fig. 14 is a view partially in top plan and partially in horizontal section of die head frame assembly the view being in the planes of line 14—14 in Fig. 15.

Fig. 15 is a side elevational view of the die head frame assembly with the reaming assembly removed;

Fig. 15A is a partial elevational view corresponding to Fig. 15 but showing the die supporting plate in assembled position;

Fig. 16 is an end elevational view of the die head frame assembly;

Fig. 17 is a side elevational view of the threading assembly;

Fig. 18 is a section on line 18—18 in Fig. 17;

Fig. 19 is an elevational view of one of the chasers of which several are included in the threading assembly;

Fig. 20 is an edge elevation of the chaser as observed from the left of Fig. 19;

Fig. 21 is a side elevational view of the base portion of the cut-off frame assembly with a gear assembly operatively supported thereby;

Fig. 22 is an elevational view as observed from the left end of Fig. 21;

Fig. 23 is a top plan view of the cut-off assembly;

Fig. 24 is a side elevational view of the major portion of the cut-off frame assembly which cooperates with the base portion shown in Fig. 21;

Fig. 25 is a top plan view of the cutting oil system;

Fig. 26 is a side elevation of the structure shown in Fig. 25;

Fig. 27 is an end elevation of the oil supply arrangement of Figs. 25 and 26;

Fig. 28 is a partial elevational view of the die head frame and showing the oil line connection therewith; and Fig. 29 is an enlarged horizontal section in the plane of line 29—29 on Fig. 28.

Figure 1:
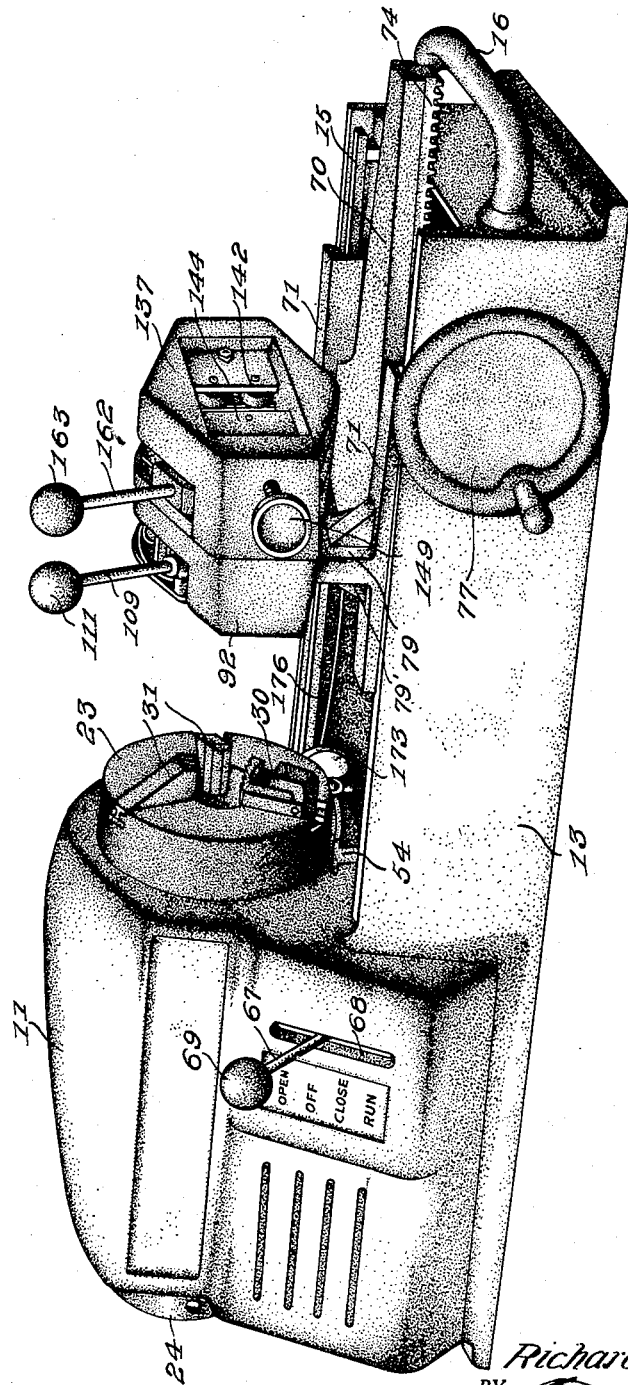
Fig. 1 is a perspective view of the improved machine in accordance with a preferred structural embodiment thereof.
Figure 5:
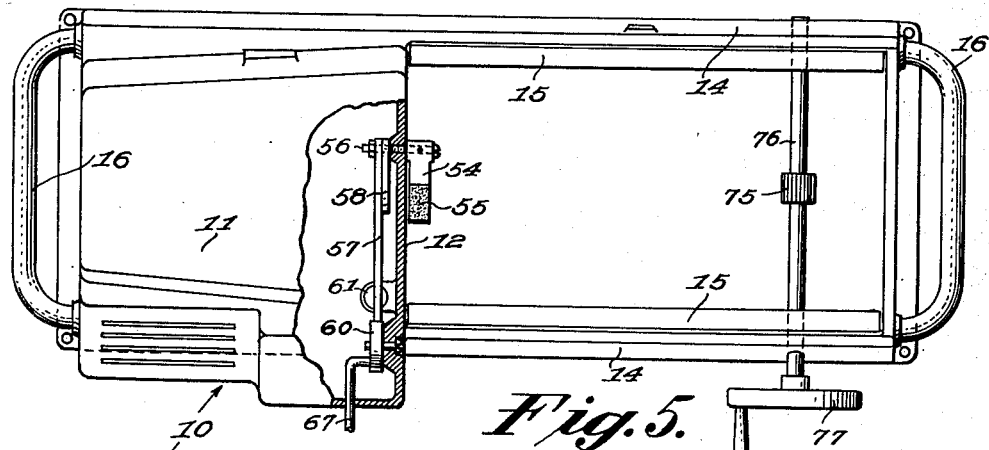
Fig. 5 is a top plan view of the supporting and housing frame partially broken away and showing brake mechanism forming a part of the improved machine.
Figure 6:
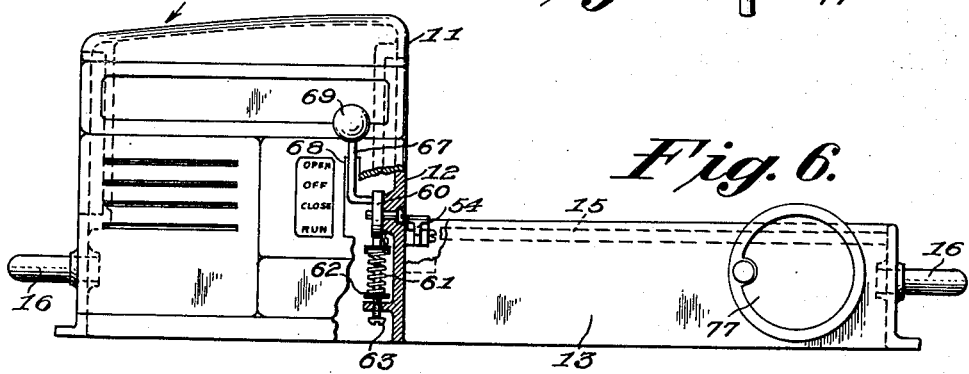
Fig. 6 is a side elevational view of the frame partially broken away and in section.
Figure 7:
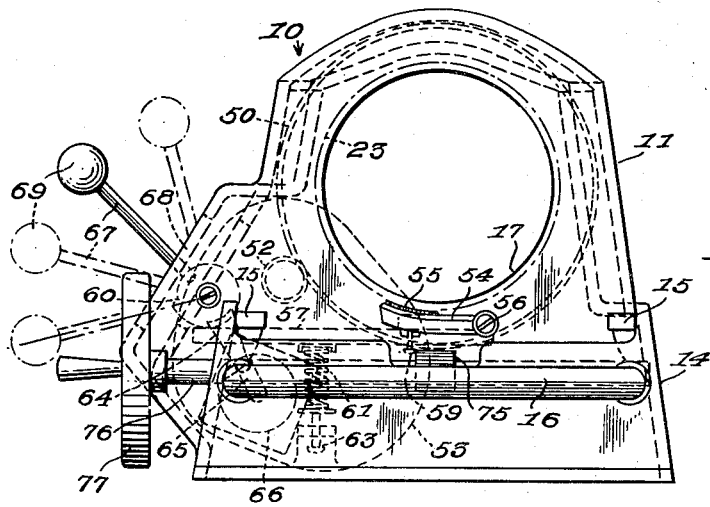
Fig. 7 is an end elevation of the frame as observed from the right of Figs. 5 and 6.

Referring now in detail to the drawings the improved machine includes a main housing and supporting frame 10 (Figs. 1, 5, 6 and 7) which generally comprises an end portion 11 which forms an enclosure for the driving motor and the spindles of the chuck assembly and such portion includes a vertical end wall 12. An indicated in Figs. 1 and 7 the frame end portion 11 is wider at the bottom than at the top and the bottom at one side of the portion 11 extends laterally with respect to the vertical center line of the chuck to an extent greater than the other side to provide space for the motor, later referred to, as well as for accommodating the brake operating mechanism, also later referred to.

The frame 10 also includes an open top portion 13 which includes opposite side walls 14 and an elongated track 15 is rigidly supported by each side wall interiorly thereof for a purpose later referred to.

The frame 10 is preferably provided with a cylindrical handle 16 at each end thereof for facilitating movement of the machine from one position to another.

The frame supporting and housing portion 11 is provided in opposite ends thereof with relatively large, circular openings 17 and 18 (Fig. 3) in which are supported the outer races of ball bearing assemblies 19 and 20 whose inner races support an outer tubular spindle 21 (Fig. 8) of a work gripping chuck assembly.

The chuck assembly further includes an inner tubular spindle 22 concentric with and substantially spaced from the outer spindle.

The inner spindle rigidly supports front and rear jaw housings 23 and 24 at its opposite ends as by threaded connections shown in Fig. 8.

The front jaw housing 23 is provided with a plurality (preferably three as shown) of radially disposed guide ways 25 and 26 which extend from a central work receiving opening 27 in the housing to the outer cylindrical surface 28 thereof and the guide ways open through the front plane face of the housing.

The guide ways each include a pair of oppositely disposed guide flanges 29.

A master jaw 30 is supported in the guide way 25 and secondary jaws 31 are supported in the guide ways 26, and the jaws are provided with channels for receiving the guide flanges 29.

The jaws 30 and 31 are provided with teeth 32 in meshing engagement with a spiral tooth 33 on a ring 34 and which ring is rigidly secured to the front end of the outer spindle 21 by means of a plurality of shear pins 35. The rear jaw housing 24 is provided with a plurality (preferably three) of the jaw guide ways which preferably are in the form of circular apertures 36 which extend radially within the housing from an inner circular work receiving opening 37 therein to the outer cylindrical wall of the housing.

A jaw 38 is disposed in each guide aperture 36 and the jaws 38 are provided with teeth 39 in meshing engagement with a spiral tooth 40 on a ring 41.

The ring 41 is frictionally engaged with an adjustment ring 42 as by means of bolt supported washers 43 and the adjustment ring is threadedly engaged with the rear end of the outer spindle 21 as is shown in Fig. 8.

The master jaw 30 includes a base portion 44 to which is pivotally connected a dog 45 which is provided with work gripping teeth 46. A relatively strong leaf spring 47 has one end thereof secured to the base portion 44 and by means of a screw 48 and the free end of the spring bears on the pivoted dog 45 for yieldably resisting counterclockwise movement of the dog upon clockwise rotation of the jaw housing 23.

The secondary jaws 31 preferably have teeth extending normal to the axis of the jaw head to prevent axial movement of the work and the jaws 38 in the rear housing 24 are preferably provided with smooth work engaging ends since such jaws act only to center and steady the work supported and rotated by the chuck assembly.

A relatively large gear 50 is rigidly connected to the outer spindle 21 as by means of a key 51 and in the assembled position of the chuck assembly as in Figs. 2, 3 and 4 the gear is in meshing engagement with a pinion 52 projecting from and driven by a motor 53 suitably supported in the housing portion 11 of the frame 10.

The jaw housings 23 and 24 are disposed externally of the front wall 12 and the rear wall of the frame housing portion 11 as indicated in Fig. 3 and the cylindrical peripheral surface of the front housing 23 acts as a drum which is engageable by a brake including a shoe 54 (Figs. 5, 6 and 7) having a brake lining 55. The shoe 54 is disposed forwardly of the wall 12 and externally of the housing portion 11 directly beneath the housing 23.

The brake shoe 54 is secured to one end of a screw bolt 56 extending through the wall 12 and rotatable therein. The other end of the bolt is disposed within the housing portion 11 adjacent wall 12 and one end of a link 57 is pivotally supported on the bolt. A second and shorter link 58 has one end thereof secured to the bolt 56 and a screw adjustment connection 59 is provided between the other end of link 58 and the link 57 to provide for relative adjustment between the link 57 and the brake shoe 54. The brake operating link 57 extends toward the front wall of the housing portion 11 and the other or forward end thereof is disposed immediately below a cam 60 which is disposed within housing portion 11 and is rotatably supported by the front wall 12 thereof. A coil spring 61 is disposed beneath the link 57 and is adjustable by means of a follower 62 and screw 63 and which spring yieldably urges the forward free end of the link 57 into contact with the cam 60.

The purpose of the cam 60 is to lower the link 57 and thereby move the brake out of engagement with the housing 23 which is engaged by means of spring 61 and to control the motor 53 which is effected by means of an arm 64 projecting from the cam and having a lost motion connection with an arm 65 extending from a switch box 66 on the motor 53.

An arm 67 has one end thereof secured to the cam 60 and the arm extends through an upright slot 68 in the front wall of housing portion 11 and the outer end of the arm is provided with a hand engageable manipulating knob 69. The front wall of housing portion 11 is provided with indices "open," "off," "close," and "run" adjacent the slot 68 and which will be later referred to in the operation of the machine.

The chuck assemblies as above described form the subject matter of my co-pending application, Serial No. 136,918, filed January 5, 1950, now U. S. Patent No. 2,591,389, issued April 1, 1952, and accordingly no claim to such is herein made except its operative cooperation with other structural elements entering into the machine.

Figure 11:
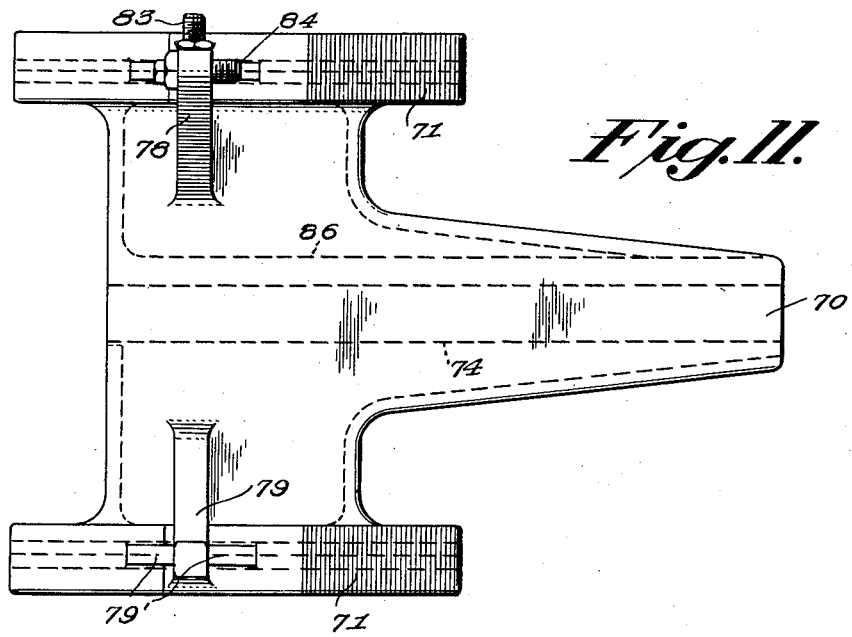
Fig. 11 is a top plan view of a carriage embodied in the machine.
Figure 12:
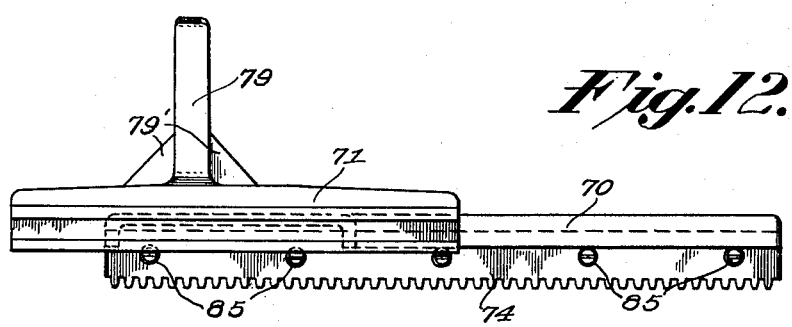
Fig. 12 is a side elevational view of the carriage shown in Fig. 11.
Figure 13:
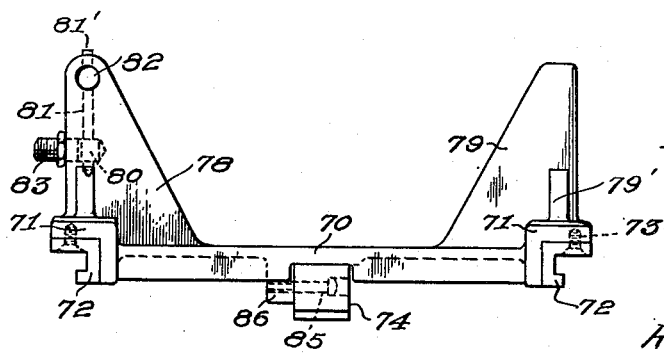
Fig. 13 is an elevational view of the carriage as observed from the left hand end of Fig. 11.

A carriage is slidably disposed on the tracks 15 in the frame portion and as shown more particularly in Figs. 11, 12 and 13. Such carriage comprises a generally T-shaped base portion 70. At the opposite sides of the head of the base portion are rails 71 which in cross section are generally L-shaped as indicated in Fig. 13 and channelled track engaging members 72 are secured in such rails as by means of screws 73. The carriage is removable from the frame 10 and may be easily placed thereon by positioning same far forwardly on the frame and engaging the forward ends of tracks 15 in the rear ends of the track engaging members 72 whereupon the carriage may be moved rearwardly on the frame with the tracks 15 engaged within the members 72.

The carriage base 70 is provided with an elongated rack 74 on the bottom face thereof and such rack is engageable by a pinion 75 rigidly supported on a shaft 76 extending transversely of the frame portion 13 and rotatably journalled in the side walls 14 thereof.

The shaft 76 is provided with a hand wheel 77 externally of the front wall 14 whereby upon hand manipulation of the wheel, the carriage may be moved along the frame portion 15 by means of the intermeshing rack 74 and pinion 75. Vertically disposed standards 78 and 79 are rigid with and project upwardly from the rails 71 and such standards are disposed in transverse alignment. The standards 78 and 79 are provided with fillets 79' for strength. The standard 78 is provided with an internal opening including an aperture 80 extending laterally inwardly from the outer edge and intermediate the top and bottom ends thereof. The aperture 80 communicates with an internal vertical aperture 81 and which in turn communicates with a lateral aperture 82 adjacent the top of the standard and which opens through opposite side faces thereof at right angles to the aperture 80. The aperture 81 extends through the upper end of standard 78 above aperture 82 and is normally closed by a plug 81'.

An oil conduit engaging nipple 83 is supported in the aperture 80 and a hollow bolt 84 is rotatably disposed in the aperture 82 for purposes later to appear.

The rack 74 may be removably secured to the carriage base 70 as by means of a plurality of screw bolts 85 extending through the rack and threaded into a rib 86 on the bottom of the base 70.

The carriage 70 is adapted for support of a threading mechanism and a cut-off and reamer mechanism.

The die head frame assembly comprises a frame 90 which includes a base plate 91 and a housing portion 92 which are suitably rigidly connected together and the housing portion is cut away at the top for visibility of the chasers and at the bottom for chip disposal. The base plate 91 is provided with a pair of spaced parallel ribs 93 for slidable support thereon of the cut-off and reaming assembly as will more fully hereinafter appear.

The frame 90 extends transversely of the main frame portion 13 and the base plate 91 is provided with a tapped boss 94 in which the threaded end of bolt 84 is secured whereby the hollow bolt 84 is pivotally supported in aperture 82 in the standard 78 which is disposed interiorly of the frame. In other words, the bolt 84 provides a pivotal support for the housing 92 and moves therewith when the housing is pivoted to make-up position.

The opposite standard 79 extends upwardly through an opening 95 in the bottom of the frame and the upper end of the standard engages a suitable stop in the frame.

In accordance with this construction, both the die head frame assembly and the cut-off and reaming assembly are pivotally supported on the carriage 70. The base plate 91 has one end of a cylindrical sleeve 96 threaded thereinto and which sleeve provides a work clearing opening 97. The sleeve 96 at its opposite or free end is provided with an outwardly directed flange 98 which together with the base plate provides a circular groove in which is rotatably supported the base 99 of a cam member 100. The cam member includes a plurality (preferably four) of arcuate flanges 101 which are eccentric to the center of sleeve 96, and arranged in the same order circumferentially of said center and have depressions 100a and curved ends 101a the purpose of which will later appear.

A stud 102 projects from the base plate 91 and on which is rotatably supported a block 103.

An arm 104 depends rigidly from the block 103 and the arm is pivotally connected at 105 to one end of a link 106 whose opposite end is pivotally connected at 107 to an arm 108 rigid with the cam member 100. A rod 109 projects from the block 103 and extends upwardly through a slot 110 in the frame and is provided at its upper end with a hand engageable operating knob 111. The construction above described provides for rotary movement of the cam member 100 in opposite directions upon corresponding movements of the rod 109 and for a toggle locking of the cam member 100 when in a closed position.

A plurality of threading assemblies as shown in Figs. 17 and 18 are provided in the machine, each of said assemblies supporting chasers 127 capable of threading a different size pipe or bolt within the capacity of the machine.

The stud 102 is extended at 112 and such extension together with a stud 113 engages within apertured bosses 114 and 115 projecting from the plate 116 of the threading assembly which as shown in Fig. 14 is flush with the outer wall of the housing.

As shown, the plate 116 includes upper and lower ears 117 and 118 from which the bosses 114 and 115 project, said plate is of symmetrical form so that either of the bosses 114 or 115 may engage the stud 113.

A chaser supporting circular plate 120 is supported by and in contact with the plate 116 and is rotatably adjustable relative thereto for a purpose later to appear.

The rotatable adjustment is effected by means of a pair of bolts 121 carried by the plate 116, which extend through circumferentially elongated slots 122 in the plate 120, the plates being locked in any relative adjustment by means of nuts 123 on the bolts 121.

The plate 120 rigidly supports a plurality (preferably four) of chaser guiding brackets 124 which as shown are in the form of rectangular blocks having radially disposed guide openings 125 and intersecting slots 126 at right angles thereto. The threading chasers 127 are slidably disposed within the guide openings 126 and such chasers are provided with slots 128 which are traversed by the cam flanges 101. The chasers 127 are provided with thread cutting teeth 132. Different sets of chasers are used in the plurality of threading assemblies provided with the machine.

In order to retain the chasers 127 in their respective brackets 124 when the threading assembly in which they are slidably disposed is not mounted on the die head frame assembly a leaf spring 129 is rigidly connected to each bracket at one end thereof as indicated at 130 and the free end of the spring is provided with a small extension 131 projecting through an aperture in the bracket which engages a depression 131a in the face of the corresponding chaser and holds it in a retracted position.

Removal of a threading assembly from the die head frame assembly may be accomplished only when the chasers are in their retracted position. The corresponding position of the rod 109 for the retracted position of the chasers is shown in phantom in Figs. 15 and 15A. In this position the locking lug 119 attached to the block 103 is adjacent to either the ear 117 or 118 of the threading assembly, but not overlapping it, and thus allowing removal of same. At this time also the depressions 100a in the cam 100 are directly behind the slots 128 in the chasers 127 to insure easy removal.

When another threading assembly is mounted on the studs 112 and 113 and the rod 109 is pulled towards the operator causing the cam 100 to rotate in a clockwise direction when viewed as in Fig. 15, the curved edges 101a will first engage the slots 128 in the chasers 127, forcing said chasers into correct alignment with the cam flanges 101. As the cam flanges 101 cause the chasers 127 to move radially inward the springs 129 will pop out of the depressions 131a. At the same time the lug 119 attached to the block 103 will rotate as indicated in Fig. 15A as to overlap the ear 117 or 118 of the plate 116 and prevent the threading assembly from being removed from the studs 112 and 113 while the chasers are in the threading position.

By changing the circumferential position of the plate 120 relative to the plate 116 the chasers 128 are made to thread a slightly different diameter when in the threading position. This will allow for chaser sharpening and over size threads. The depressions 100a in the cam flanges 101 are sufficiently long enough to allow for a wide range of incremental sizes above and below the nominal size of the chasers. A cut-off and reamer assembly 135 (Figs. 21 to 24) is operatively associated with the die head assembly just disclosed.

The cut-off and reamer assembly comprises an elongated frame including a base plate 136 and a housing portion 137.

The base plate 136 is provided with guideways 138 which receive the ribs 93 on the die head base plate 91 whereby the cut-off and reamer assembly is supported on the die head frame assembly for movement longitudinally thereof or transverse to the longitudinal axis of the main frame portion 13.

The housing portion 137 is provided with a cut out 137a on its rearward end to allow insertion upon and removal from the die head base plate ribs 93 of the cut-off and reamer assembly. The housing portion 137 is likewise provided with an abutment 139a on its forward end to prevent transverse sliding of the cut-off and reamer assembly when in the raised position for screwing a fitting onto a pipe. The housing portion is further provided with a cut out 137b along its top for visibility of the reamer and cutter wheel, and with a bottom cut out 137c along its bottom for chip disposal.

The housing portion 137 receives and is secured to the base portion by means of screws 139. The base plate 136 is provided with a work receiving opening 140 normally axially aligned with the opening 97 in the die head assembly and the housing portion 137 is provided with a rectangular opening 141 a portion of which is opposed to the opening 140.

The housing portion 137 is provided with a pair of work engageable rollers 142 at one end of the rectangular opening 141. A disc cutter 143 is rotatably supported by a block 144 which is slidably supported on tracks 145 supported by housing portion 137 adjacent the opposite end of opening 141.

The work is adapted to normally engage the rollers 142 and the cutter disc 143 is adapted to be brought into cutting action with the work which action is in accordance with the present invention effected by the rotating work.

An elongated screw 146 is threadedly engaged in a bevelled pinion 148 rotatably supported by the housing portion 137. One end of the screw is swivelly connected to the block by the pin 143a as indicated at 147 in Fig. 24, while the other end is engaged with a hand operable knob 149. The knob 149 is used for several functions; by turning to manually operate the screw and gear train, by pulling to cause the cut-off and reamer assembly to slide relative to the die head assembly, and by lifting to raise the die head and the cut-off and reamer assemblies from their position on the carriage. This knob is shaped with a curved rear surface for comfort in pulling.

The improved means for effecting movement of the block 144 and cutter disc 143 by rotation of the work comprises the following cooperating elements. A plate 150 is rotatably supported on the base plate 136 as indicated at 151. A relatively large bevel gear 152 is rotatably supported on the plate 150 coaxially of its pivotal mounting and preferably by means of the same bolt 153 which pivotally connects the plate 150 to the base plate 136 and the bevel gear 152 is constantly in mesh with the bevelled pinion 148.

The bevel gear 152 is adapted to be rotated by the rotating work for effecting movement of the cutter disc into cutting engagement with the work and also for moving the cutting disc away from the work after its cutting operation. Accordingly, two gear trains are provided on the plate 150, a lower one for movement of the cutter disc toward the work, and an upper one for moving the cutter disc away from the work.

The lower gear train comprises a gear 154 in meshing engagement with peripheral teeth on the gear 152, a gear 155 in meshing engagement with gear 154 and a gear 156 on the inner side of a work engageable roller 157. The upper gear train comprises a gear 158 in meshing engagement with a gear 159 on the inner face of gear 152 and a gear 160 on the inner face of a work engageable roller 161.

The gears and rollers are all pivotally supported on the plate 150 and the plate is provided with an operating handle 162 having a hand engageable operating knob 163 on the outer free end thereof. The rollers 157 and 161 have knurled surfaces for obtaining a good friction grip with the pipe.

The dot-and-dash line in Fig. 21 indicates the arcuate movement of the plate 152 as effected by the handle 162.

Upon movement of the handle to the left (Fig. 21) or towards the operator as viewed in Fig. 3 the roller 157 will be brought into engagement with the rotating work and through the successive gears 156, 155, 154, 152 and pinion 148 and screw 146, the block 144 will be moved toward the work and accordingly the cutter disc will be brought into cutting engagement with the work. At this time the cut-off and reaming assembly will slide on the guide ways 133 so that the rollers 142 bear against the pipe.

Upon movement of the handle 162 to the right, or away from the operator the roller 161 will be brought into engagement with the rotating work and the block 144 together with the cutter disc 143 will be moved away from the work through the gears 160, 158, 159, 152, pinion 148 and screw 146.

The housing portion 137 is provided with a conical reamer 164 which is held rigid therewith as by means of a bolt 165. The base plate 136 is provided with a circular work receiving opening 166 opposite the reamer 164 and such opening may be brought into alignment with the work subsequent to the cutting-off operation by pulling on the knob 149 which will cause movement of the cut-off and reaming assembly relative to the die head assembly as is afforded by the interengaging ribs 93 and the guide ways 138. This position is shown in Fig. 29.

The machine includes novel means for providing oil to the work in the vicinity of the threading operation as effected by the chasers 127 and such means in accordance with a preferred embodiment thereof is shown in Figs. 25 to 28 inclusive.

An oil supply tray 170 is suitably supported within the frame portion 13 and an oil filter screen 171 is suitably supported within and substantially above the bottom of the tray in the provision of an oil chamber 172 therebetween. An oil pump 173 is suitably supported by the main frame end wall 12 and includes a pinion 174 which is disposed beneath and driven by the chuck gear 50.

A conduit 175 extends from the pump down into the oil chamber 172. A conduit 176 extends from the pump above the screen 171 and communicates with a connection 177 in one of the frame side walls 14.

A flexible conduit 178 has its opposite ends in communication with the connection 177 and the nipple 83 whereby oil is pumped through apertures 80 and 81 in standard 78 and thence through the hollow bolt 84.

A tube 179 is suitably supported on the inner face of the base plate 91 of the die head frame assembly and such tube has one end thereof connected to the head of the hollow bolt 84 and the opposite end of the tube extends vertically downward at 180 adjacent to and in the vertical center line of the die head assembly, whereby oil is delivered to the surface of the work and from which it falls by gravity onto the top face of the filter screen 171.

When the base plate 91 of the die head frame assembly is resting on the carriage standard 79 in the position shown in Fig. 28 the transverse hole drilled in the bolt 84 is aligned with the hole 81 in the standard 78 allowing oil to flow uninterrupted from the hole 81 through the transverse hole into the longitudinal hole in the bolt 84 into the tube 179. When the base plate 91 is raised into the position shown in Figs. 4 and 4B the bolt 84 will rotate with it and the transverse hole in the bolt will no longer be aligned with the hole 81 in the standard 78 as is indicated by the dotted lines extending transversely of the bolt in Fig. 29. This will effectively stop the flow of cutting oil to the tube 179 and will prevent loss of oil when the threading mechanism and the cut-off and reamer assembly are in the raised position.

Having described in detail the mechanical construction of the novel machine, the operation thereof may be briefly stated as follows:

A pipe to be operated upon is introduced within the inner spindle 22 of the chuck assembly and the pipe is positioned such that the point where it is to be cut-off falls approximately midway between the ends of the carriage guides 15. The chuck is then closed by pulling the handle 67 downward to the "close" position in the manner clearly set forth in my referred to co-pending application.

After the jaw 30 has gripped the pipe tightly it will begin to rotate and the motor will slow down. The chuck operating handle 67 is then moved to the "run" position which will remove the load from the motor caused by the slipping of the brake 54 against the chuck housing 23. The carriage 70 is moved by the hand wheel 77, pinion 75 and rack 74 to a position wherein the cut-off disc 143 is at the desired cutting-off position, preferably substantially midway between the end of the carriage guide tracks.

The handle 162 is then pulled down, or towards the operator, whereupon the roller 157 will engage the rotating pipe and through the associated gear train the cutting disc 143 will be moved into cutting engagement with the rotating pipe.

The cutting-off operation will require about only 6 seconds on a 2" pipe. After the pipe has thus been cut-off, the handle 162 is moved upwardly, whereupon the roller 161 will engage the rotating pipe and through the associated gear train, the cutting disc 143 will be moved away from the pipe at relatively high speed.

After the cutting-off operation, the pipe end is ready for threading which is carried out by moving the carriage 70 away from the end of the pipe far enough to clear the chasers 127.

The chasers 127 are then closed by pulling the handle down or towards the operator, and are started threading by bringing them into engagement with the cut-off end of the pipe upon movement of the carriage 70 by the hand wheel 77. Once started, the chasers alone will move the carriage.

Cutting oil is fed in a steady stream through the conduit 179-180 directly over the chasers.

When sufficient thread has been cut, the chasers 127 are lifted by moving the handle 109 up or away from the operator. After the threading operation, the housing 137 is moved toward the operator by grasping the knob 149 whereupon the reaming assembly slides along the threading assembly by means of the interengaging ribs 93 and the guide ways 138 all as indicated in Fig. 4A.

The reamer 164 is axially alined with the pipe and is brought into operative contact therewith by movement of the carriage 70 toward the left whereupon the end of the pipe will be subjected to a reaming operation. If desired the making up of a fitting may be done next by moving the carriage 70 away from the housing 23 far enough for the threading chasers 127, to clear the end of the pipe, whereupon the two assemblies are jointly raised through the pivotal connection 84 with the carriage as in Fig. 4B and which raising is easily effected by lifting upwardly on the knob 149. When in this position the flow of cutting oil to the die head will be stopped by the valve bolt 84. The pipe fitting may be held by hand until tight. The machine may then be stopped and the fitting tightened by a wrench.

To remove the pipe from the machine it is released from the driving chuck assembly by moving the handle 67 to the "open" position, when the jaws have opened sufficiently the handle 67 is moved to the "off" position in the manner specifically disclosed in my said co-pending application.

When it is desired to thread other size pipe the threading assembly may be readily removed from the supporting studs 112 and 113, in the manner previously described.

From the above detailed disclosure of the present invention, it will be observed that a novel portable pipe cutting-off, threading and reaming machine is provided which is capable of operating upon pipe with accuracy and in a brief period of time with minimum attention and exertion on the part of an operator.

While I have disclosed my invention in accordance with a single specific structural embodiment thereof, such is to be considered as illustrative only, and not restrictive, the scope of the invention being defined in the sub-joined claims.

What I claim and desire to secure by U. S. Letters Patent is:

1. A portable automatic pipe cutting, threading and reaming machine comprising an elongated frame, a power driven chuck rotatably supported by the frame, a carriage slidably supported on the frame and including an upright standard, a pipe threading assembly including an elongated box-like frame pivotally connected adjacent one end thereof to said standard adjacent its upper end, pipe threading chasers supported by said box-like frame intermediate its ends, said pivotal connection comprising a hollow bolt having a transverse slot therein, a bushing supported by said standard and being in communication with said slot through an aperture in the standard, an oil delivery conduit having one end thereof in communication with said hollow bolt and the other end thereof disposed above said chasers, an oil supply in said first frame, a removable conduit between said supply and said bushing, and power driven means operative by said chuck for forcing oil through said conduits to said chasers, said slot being disposed in said bolt so that the swinging of the box-like frame on said pivotal connection to an inoperative position will interrupt communication between the hollow bolt and the bushing to thereby check the flow of oil to the chasers.

2. The structure according to claim 1 wherein said oil is contained in a pan supported by said first frame, an oil filter disposed above the bottom of said pan, and said means including a pump in communication with the oil in said pan, the spent oil dripping from the chasers onto said filter.

3. In a pipe threading machine, a carriage having an oil conduit in constant communication with an oil supply, a threading assembly including a housing having a plurality of chasers operatively supported therein, said housing having a pivotal connection with the carriage, said pivotal connection including a hollow bolt having a transverse slot therein, an oil conduit supported by the housing and normally in communication with the first conduit for lubrication of the chasers in the operative position of the housing, and said transverse slot operative upon swinging the housing on said pivotal connection to an inoperative position to be rotated and to interrupt communication between said conduits and thereby check flow of oil to said chasers.

4. In a machine of the type described comprising a carriage having an oil conduit in constant communication with an oil supply, a tool supporting assembly pivotally connected to said carriage, said pivotal connection including a hollow bolt having a transverse slot therein, an oil conduit supported by said assembly and normally in communication through said pivotal connection with the first conduit for lubrication of said assembly when in an operative position, said transverse slot operative upon swinging the tool support assembly on said pivotal connection to an inoperative position to be rotated and to interrupt communication between said conduits and thereby check the flow of oil to said assembly.

References Cited in the file of this patent

UNITED STATES PATENTS

| Number | Name | Date |
|---|---|---|
| 1,159,790 | Oster | Nov. 9, 1915 |
| 1,566,700 | Schmelz | Dec. 22, 1925 |
| 1,635,447 | Vosper | July 12, 1927 |
| 1,947,874 | Pealer | Feb. 20, 1934 |
| 1,991,636 | Sternbergh | Feb. 19, 1935 |
| 2,055,909 | Pealer | Sept. 29, 1936 |
| 2,079,180 | Pealer | May 4, 1937 |
| 2,249,395 | Reese | July 15, 1941 |
| 2,266,508 | Pealer | Dec. 16, 1941 |
| 2,270,358 | Tewksbury | Jan. 20, 1942 |
| 2,415,746 | Knight et al. | Feb. 11, 1947 |